United States Patent [19]

Baron

[11] Patent Number: 5,678,399
[45] Date of Patent: Oct. 21, 1997

[54] LAWN MOWER HOUSING

[76] Inventor: Kyle L. Baron, 5260 S. Maryknoll, New Berlin, Wis. 53151

[21] Appl. No.: 578,141

[22] Filed: Dec. 26, 1995

[51] Int. Cl.$^6$ ........................................ A01D 34/70
[52] U.S. Cl. .............................. 56/320.2; 56/16.6; 56/202
[58] Field of Search ................... 56/320.1, 320.2, 56/13.1, 16.6, 16.9, 202, 203, DIG. 8

[56] References Cited

U.S. PATENT DOCUMENTS

| | | | |
|---|---|---|---|
| 4,631,909 | 12/1986 | McLane | 56/202 |
| 4,848,070 | 7/1989 | Berglund | 56/202 |

*Primary Examiner*—Terry Lee Melius
*Attorney, Agent, or Firm*—Wheeler Kromholz & Manion

[57] ABSTRACT

A cutting and mulching housing for a riding or lawn tractor accommodating a rotary cutter therein, said cutter having a grass clipping recirculating chute and a separate grass clipping discharge chute with is elevated relative to said recirculating chute. The bifurcated chute assembly separates and repeatedly recuts larger clippings and thereafter discharges them through said elevated chute. The rapid motion of the rotary cutting blade over the exit of the lower recycling chute provides a radial flow of air thereacross which circulates and directs larger, heavier clippings back into the cutting blade to be finely mulched. The elevated discharge chute may be directed into a collection device connected thereto or downwardly back into the lawn. The mulching housing may be factory installed or retrofitted onto existing lawn mowers.

9 Claims, 2 Drawing Sheets

LAWN MOWER HOUSING

BACKGROUND OF THE INVENTION

The present invention relates generally to a cutter and housing assembly for a rotary lawn mower. More particularly, this invention relates to a mulching attachment having an improved method of circulating and recutting grass clippings and other plant waste into fine mulch, which improves the efficiency of the mower.

Generally, the blade of a non-mulching rotary lawn mower passes through and cuts plant material with a single time before discharging it into a container or back onto the lawn. If left on a lawn, such large clippings will decay, and over time, create a mat which can choke and destroy the lawn. Removal and disposal of such clippings into a land fill or by burning is difficult and expensive. In addition, such methods of disposal are increasingly subject to strict environmental regulations and often disallowed altogether.

If plant clippings are cut into very fine pieces, they can be reapplied to the lawn without the danger of forming a mat and harming the lawn. Such pulverized clippings are generally referred to as mulch and are a good source of organic nutrients and acts to fertilize the lawn.

Presently, rotary mulching mowers generally utilize a substantially enclosed cutting housing that does not incorporate a discharge area. As such, at any given time, these mulching mowers have a large number of differently sized clippings confined inside the cutting chamber that are being circulated and recut in a generally circular direction therein.

The inefficiency with such an enclosed mulching mower housing is the need to cut, recirculate, mulch, and then direct the clippings downwardly into the lawn all within the same cutting area. Within the cutting area, enclosed mulching mower blades must draw-up uncut plant material into the cutting chamber while simultaneously inserting the mulch clippings back down into the lawn. As a result of this double function, enclosed mulching mowers are susceptible to stalling as the cutting chamber can easily become clogged. Therefore, neither the cutting nor the mulching process is done as effectively or efficiently as it is when done separately.

The present invention is designed to solve the aforesaid problems of the conventional enclosed mulching lawn mower by separating the discharge process from the cutting process while maintaining the recirculating and recutting action required to create fine mulch. In addition, the lower recirculating chute retains hard objects, such as sticks or stones within the housing rather than discharging them. This increases the safety of mower operation.

SUMMARY OF THE INVENTION

It is a general object of the present invention to provide a cutting and mulching lawn mower assembly having improved mulching and discharge characteristics.

It is another object of the present invention to provide a cutting and mulching lawn mower assembly wherein large clippings, which need to be recut to create mulch, are separated from clippings which have been recut to a sufficiently small enough size so as to be mulch.

It is further object of the present invention to provide a cutting and mulching lawn mower assembly of the above type, wherein at least one upper discharge chute and at least one lower recirculating chute are utilized to produce the separation of different sized clippings as aforementioned, thereby removing the clipping discharge process from the cutting and mulching process.

It is a still further object of the present invention to provide a cutting and mulching lawn mower assembly of the above type, which accommodates therein a conventional cutting blade device attached to a rotatable drive means that provides circular motion in a generally horizontal cutting plane.

It is still another object of the present invention to provide a cutting and mulching lawn mower assembly of the above type wherein larger clippings are directed beneath the aforementioned circulating cutting blade by means of a chute, the rapid motion over which creates a drawing force to the lower intake chute to facilitate a separated circulating process.

It is yet another object of the present invention to provide a cutting and mulching lawn mower assembly of the above type with a hinged discharge chute that facilitates cleaning and storage of the mulching assembly and permits clippings exiting the discharge chute to be directed into a containing device or back into the lawn.

The above and further objects, details and advantages of the present invention will be readily apparent from the detailed description and drawings which follow.

DETAILED DESCRIPTION

Figure 1:
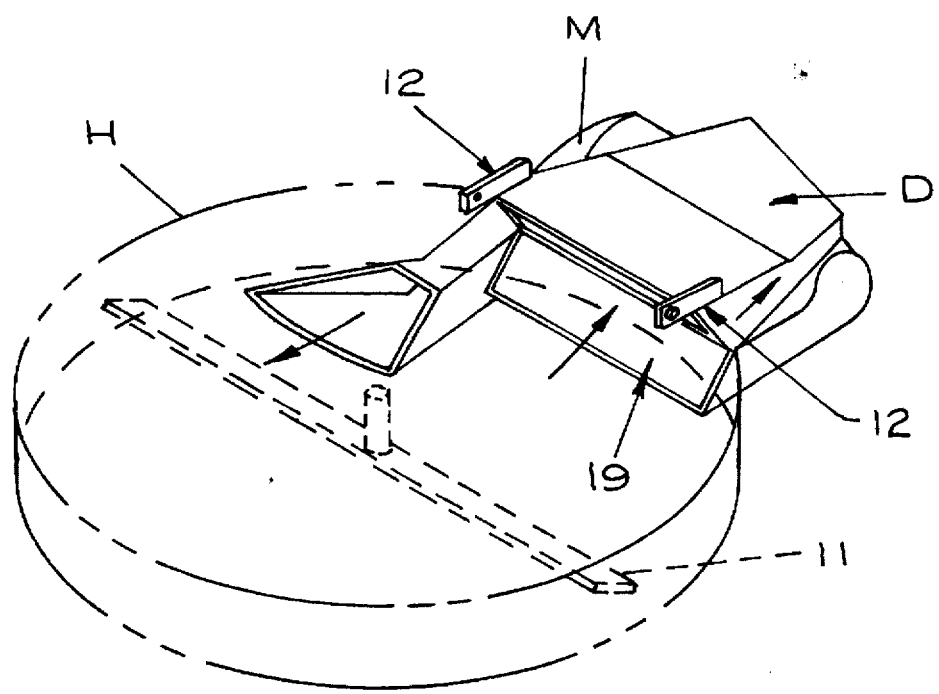
FIG. 1 is a perspective view of a rotary cutter housing for a lawn mower or the with a clipping and separating assembly attached thereto, and indicating the direction and flow of clippings.

With reference to FIG. 1, the present invention comprises a mower apparatus including a rotary cutting blade 11 for cutting and mulching lawn vegetation, and for removing the mulched clippings from the cutter housing H by means of a mulching attachment M having an elevated discharge chute D and rotary cutting blade therein 11.

Figure 2:
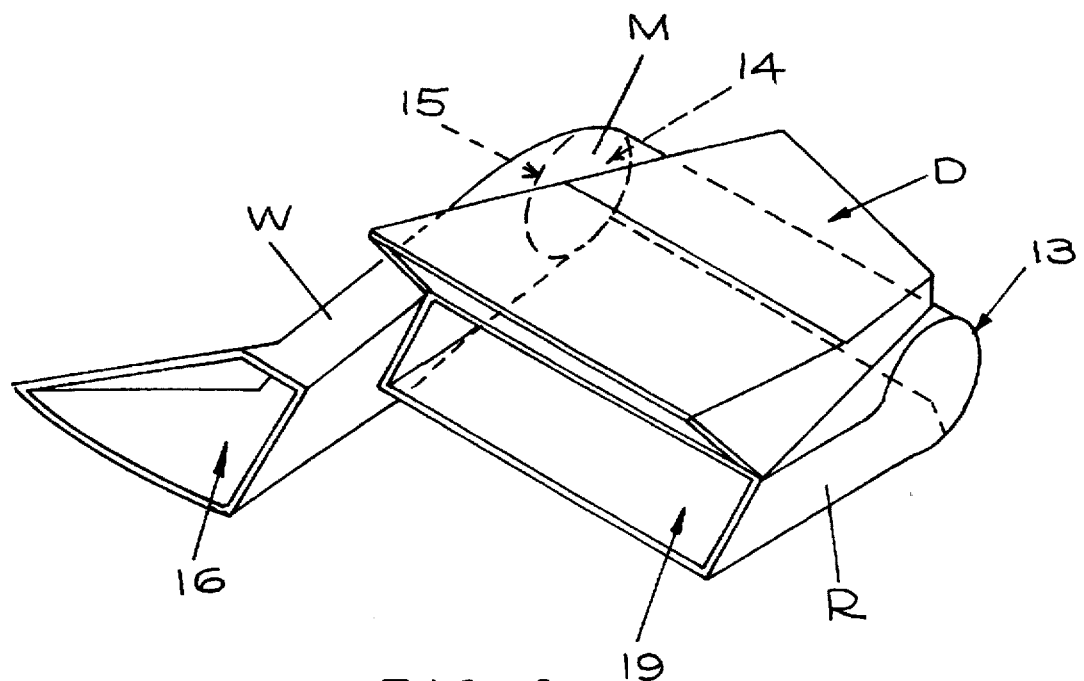
FIG. 2 is a perspective view of the clipping and separating assembly comprising an upper discharge chute and a lower recirculating chute.

In FIG. 2, the mulching attachment M is illustrated apart from the cutter housing H. The mulching attachment M shown in FIG. 2 comprises a separate recirculating chute R communicating with the discharge chute D. The cutter housing H is illustrated generally in FIG. 1 as having a single cutting blade 11 and one mulching attachment M. However, this invention is not limited to only one configuration. Numerous blade variations (not shown) may be utilized with one or more mulching attachments to achieve the utility described herein.

The elevated discharge chute D is attached generally above a recirculating chute R by means of a hinging device 12. The junction of chute R and chute D is in a general inwardly angled position relative to the opposite side of each respective chute.

The lower recirculating chute R includes a generally cylindrical region 13 opposite the chute R entrance 19 with an additional opening at one end 14 of said cylindrical region attached to chute W at the outer circumference thereof 15. As depicted in FIG. 2, chute W incorporates an opening opposite the attachment to chute R.

This opening 16 of chute W is configured to extend below the cutting blade 11, as shown 16 in FIG. 4.

Figure 4:
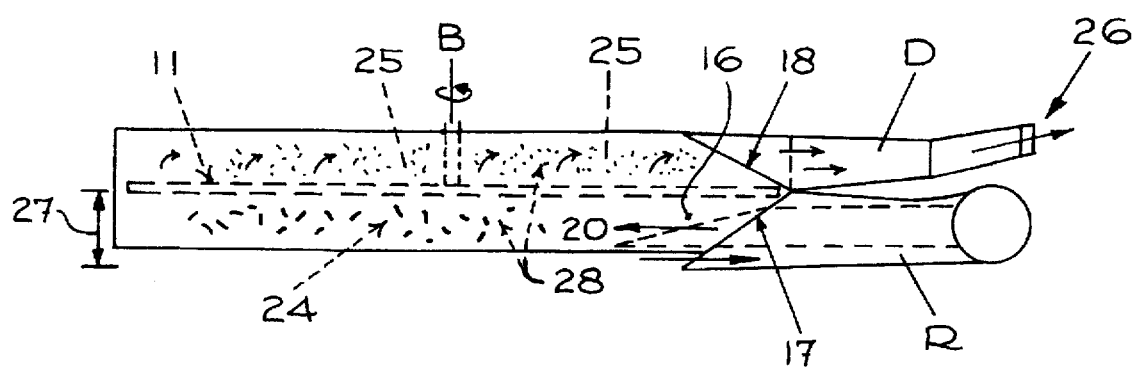
FIG. 4 is a vertical cross-sectional side view of the cutter housing and mulching attachment taken along lines X-Y of FIG. 3.

Also shown in FIG. 4, is the position of the lower recirculating chute R opening to be generally at, or below, 17 the circular plane of the cutting blade 11 with the upper discharge chute D opening positioned primarily above 18 said plane.

In operation, the rotary cutting blade 11, depicted in FIG. 1 and FIG. 4, is rotated by a conventional internal combustion, or other lawn mower motor (not shown), in a generally horizontal cutting plane around a generally vertical rotational axis such that the blade passes closely over the discharge opening 16 of chute W.

The rapid and repeated passes of the cutting blade over the chute W opening 16 creates a radial flow of air within the cutter housing and across the chute W opening 16. The Bernouli effect of this airflow across the chute opening 16 in turn creates a drawing force at the opening 19 of chute R. The generally cylindrical region 13 of chute R creates a helical twist as the circulating air passes through said region and this directs the larger clippings that have entered chute R into chute W and under the cutting blade 11 to be recut in the direction shown by the arrow 20.

Figure 3:
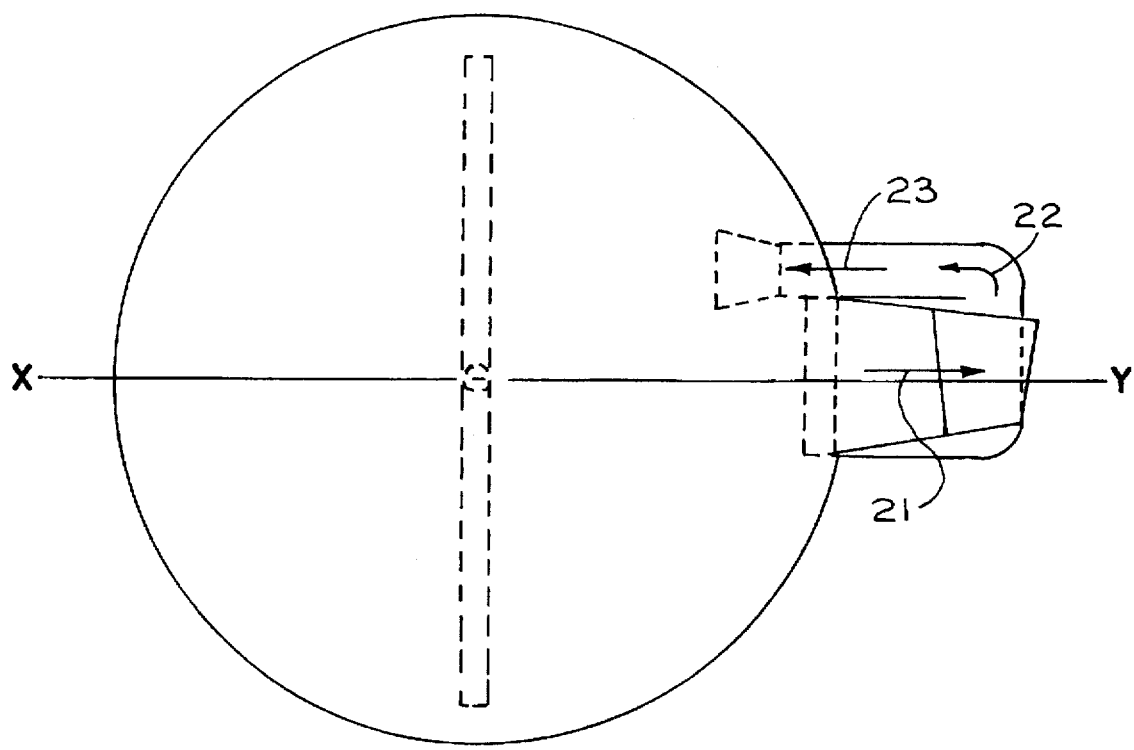
FIG. 3 is a top plan view of the rotary cutter housing of FIGS. 1 and 2, including the mulching attachment.

FIG. 3 is a top plan view of the cutter housing H and the mulching attachment M showing a complete path 21, 22, 23 of recirculating clippings.

Simultaneous to generating the circular airflow mentioned above, the cutting blade 11 severs plant growth as it enters the cutter housing at a height determined by the distance of the blade edge from the lower edge 27 of the housing H which may be variably elevated relative to the ground in the conventional manner associated with grass mowers or the like. This repeated cutting action causes numerous clippings of various sizes to be circulated in the general direction of the rotating cutting blade 11. As the clippings shown in FIG. 4 at 28 rotate entrained in the circumferential airflow, the larger, heavier, clippings are drawn by gravity to remain substantially in the lower region 24 of the cutter housing H while smaller, lighter, clippings are elevated toward the upper region 25 of the cutter housing and discharged through the discharge chute D at exit 26.

The above described embodiments of this invention are considered as illustrative only of its principles and are not to be limited. Although the disclosure hereof is detailed and exact to enable those skilled in the art to practice the invention, the physical embodiments herein disclosed merely exemplify the invention which may be embodied in other specific structure. Thus, it is obvious that many changes and modifications may be made thereunto without departing from the spirit and scope of the invention. While the preferred embodiment has been described, the details may be changed without departing from the invention, which is defined by the claims.

What is claim is:

1. An improved cutting and mulching attachment for a lawn mower having a cutter housing, a cutter housing aperture formed in said housing, and a cutting means contained within said housing, the attachment comprising:

a chute assembly mounted on and having an entrance aperture encompassing the housing aperture for receiving lower lawn clippings discharged from said housing, said chute assembly having an upper and a lower chute member;

said upper chute member defining a grass clipping discharge passage having an opening positioned inwardly of said cutter housing in a position generally above said lower chute member and said cutting means;

said lower chute member defining a grass clipping recirculating passage having an intake opening within said cutter housing positioned generally below said upper chute and a discharge opening within said cutter housing positioned generally at or below said cutting means.

2. The mulching attachment of claim 1, wherein said cutting means includes at least one rotary cutting blade.

3. The mulching attachment of claim 1, wherein said cutter housing comprises a generally cylindrical apparatus opening downwardly.

4. The mulching attachment of claim 1, wherein said upper discharge chute member is attached thereto by a hinged device.

5. The mulching attachment of claim 1, wherein said lower chute member includes a generally cylindrical section opposite of said lower chute member intake opening.

6. The mulching attachment of claim 5, wherein said lower chute member includes a discharge opening connected to an end of said cylindrical section wherein said discharge opening is positioned underneath the rotational plane of said cutting means.

7. The mulching attachment of claim 6, wherein said lower chute member comprises a discharge chute attached thereto, whereby said discharge chute is configured to establish a radial flow of air across said opening so that clippings entrained by the air flow and entering the lower chute housing are redistributed into the cutter housing.

8. The mulching attachment of claim 1, wherein said upper discharge chute member is integral with the lower chute member.

9. The mulching attachment of claim 1, wherein the chute assembly and the cutter housing are discrete, and wherein the chute assembly includes appropriate means for securing said chute assembly to said cutter housing.

* * * * *